United States Patent [19]

Bofinger et al.

[11] Patent Number: 5,033,506

[45] Date of Patent: Jul. 23, 1991

[54] DELIVERY VALVE

[75] Inventors: Guenter Bofinger, Vaihingen/Enz; Manfred Narr-Hess, Fellbach, both of Fed. Rep. of Germany

[73] Assignee: Robert Bosch GmbH, Stuttgart, Fed. Rep. of Germany

[21] Appl. No.: 473,946

[22] PCT Filed: Aug. 16, 1989

[86] PCT No.: PCT/DE89/00534

§ 371 Date: Feb. 9, 1990

§ 102(e) Date: Feb. 9, 1990

[87] PCT Pub. No.: WO90/02875

PCT Pub. Date: Mar. 22, 1990

[30] Foreign Application Priority Data

Sep. 9, 1988 [DE] Fed. Rep. of Germany ....... 3830736
Dec. 24, 1988 [DE] Fed. Rep. of Germany ....... 3843819

[51] Int. Cl.⁵ ............................................. F02M 59/46
[52] U.S. Cl. .......................... 137/516.27; 137/543.23; 123/467
[58] Field of Search .............. 137/516.27, 540, 543.21, 137/543.23; 123/467, 506

[56] References Cited

U.S. PATENT DOCUMENTS

| | | | |
|---|---|---|---|
| 2,792,846 | 5/1957 | Grieshaber et al. ............. | 137/543.23 |
| 2,922,581 | 1/1960 | Garday ...................... | 137/516.27 X |
| 3,965,876 | 6/1976 | Tissot ...................... | 123/467 |
| 4,467,767 | 8/1984 | Kampichler et al. ............. | 123/467 |
| 4,577,606 | 3/1986 | Bohringer et al. ............. | 123/467 X |
| 4,648,369 | 3/1987 | Wannenwetsch .................. | 123/467 |

FOREIGN PATENT DOCUMENTS 2306270 8/1974 Fed. Rep. of Germany ...... 123/467
789234 1/1958 United Kingdom ................ 123/467

Primary Examiner—John Rivell
Attorney, Agent, or Firm—Michael J. Striker

[57] ABSTRACT

A delivery valve for controlling fuel flow from a fuel-injection pump to an internal combustion engine and comprising a seat member, a closing member movable relative to the seat member for controlling flow of fuel through the passage channel of the seat member, and a spring for biasing the closing member into engagement with a valve seat on the seat member. The closing member includes a return-flow collar sealingly displaceable in the passage channel and located outside of the passage channel in an open position of the delivery valve, and a control collar located closely adjacent to the return-flow collar. The control collar has a diameter corresponding to a diameter of the passage channel, a periphery and at least one recess formed on the periphery and extending along an entire length of the control collar. The one recess has a variable cross-sectional area defining with a delivery edge of the passage channel a connecting flow cross-sectional area between a working chamber of the fuel injection pump and a conduit for delvery fuel to the fuel injection point. The size of the variable cross-sectional area is so selected that the connecting flow cross-sectional area increases with an increase in a fuel delivery rate upon displacement of the closing member against bias of the compression spring until the connection flow cross-sectional area becomes equal to maximum size of the variable cross-sectional area of the recess.

9 Claims, 3 Drawing Sheets

DELIVERY VALVE

BACKGROUND OF THE INVENTION

The invention relates to a delivery valve. In such a delivery valve known from German Auslegesschrift 1,236,863, the return-flow collar is separated by an annular groove from the collar which has at least one recess, in the present case two. This recess is designed as a ground portion and remains within the passage bore in every position of the closing member of the delivery valve. The closing member has a conical sealing face at the end located on the same side as the pump working space and, on the same side as the spring space, a fixed stop, against which it abuts during each of its opening strokes when the compression spring used is of a very soft type. The recess which is provided on the closing member and which thus always has a constant cross-sectional area is designed as a throttle cross-sectional area. The object of this throttle cross-sectional area is to move the delivery-valve closing member into its closing position more quickly at the end of injection, after the closing of the injection nozzle, since the pressure waves reflected in the delivery conduit impinge on the throttle cross-sectional area, creating a resistance which has the effect of a closing force acting on the closing member in addition the compression spring. Because of the different feed rates or feed speeds of the fuel through the delivery valve or the feed line during idling, on the one hand, and under full load at high engine speed, on the other hand, the effect of the throttle on the closing movement of the closing member decreases towards idling, since the pressure wave is relatively weak, that is to say the throttle cross-sectional area provides a lower resistance to this pressure wave and more fuel can flow off through the throttle per unit of time. The closing member is closed correspondingly more slowly, and therefore a larger proportion of the delivery conduit volume is filled through the closing valve with fuel from the pump working space during idling than under full or partial load, so that pressure reduction in the delivery conduit varies from a minimum amount during idling to a maximum amount under full load.

Such a delivery valve thus serves for controlling the residual pressure in the delivery conduit and for adjusting the fuel feed rate as a function of the injection quantity and the engine speed. At the same time, the throttle operational during the shut-off surge influences the injection rate during the delivery phase of the fuel-injection pump and reduces the fuel-injection quantity under full load with an increase in engine speed.

In known delivery valves, in which the closing member has a return-flow collar and does not run against a fixed stop during each deliver operation, the passage-bore cross-sectional area adjacent to the return-flow collar on the same side as the pump working space and opened by the closing member, is very large, in particular larger than the free cross-sectional area of the adjoining delivery line. In such valves, widely varying injection quantities occur, when the high-pressure delivery of the fuel-injection pump is at a constant setting. Especially in a distributor injection pump, these varying fuel-injection quantities cannot corrected by an appropriate adjustment of the effective delivery stroke of the pump piston, since all the injection points of the internal-combustion engine are supplied alternately from a single pump working space and the quantity control for all the injection points therefore has to be the same, presupposing that there is no injection-quantity control device which controls the injection quantity per delivery stroke of the pump piston individually. However, such a control involves a considerable outlay. Quantities can also be influenced by other secondary measures, such as, for example, stroke limitations of the delivery valve, but this again does not produce the uniform effect desired over the entire operating range of the fuel-injection pump and moreover likewise involves a very high outlay.

SUMMARY OF THE INVENTION

The object of the invention is a delivery valve in which the abovementioned quantity variations can be prevented by a simple measure. The object of the invention is achieved by providing the control collar adjacent to the return flow collar. The control collar has a recess that together with a delivery edge of a passage channel defines a connecting flow cross-sectional area between a pump working space and the delivery conduit. The opening behaviour of the delivery-valve closing member is influenced by such a control collar. In a delivery-valve closing member which, as known, has the return-flow collar and an adjoining very large flow cross-sectional area on the same side as the pump working space, the emergence of the return-flow collar from the passage channel results in the opening of an annular connecting cross-section which, even after only a few tenths of a millimeter of the emerging stroke, exposes a cross-section which is larger than the free cross-section of the adjoining delivery line. The opening operation results in an overswing of the opening stroke towards a larger connecting cross-section than would be necessary for the conveyance of the current delivery rate. Subsequently, because of the pressure build-up in the delivery line, the delivery valve swings back again and prevents conveyance until it is pushed open again. This swing process produces surges in the delivery characteristic over the feed period of the particular delivery stroke of the pump piston or over the injection period. Depending on the design of the delivery path at the individual injection points, this results in differing quantity distributions and also differing undulated quantity curves with a changing delivery rate against the engine speed, thus leading to deficiencies. In the embodiment according to the invention, the overswing is prevented because the connecting cross-section between the pump working space and the delivery line is opened more slowly and continuously with an increasing delivery rate, thereby avoiding, during the delivery, pressure peaks and pressure drops which, in the delivery valve according to the state of the art, have lead to the undulated quantity curve. At the same time, the recess as a whole does not represent a throttle cross-sectional area, since the free average cross-sectional area can be enlarged with an increasing delivery rate, so that the passage cross-sectional area and consequently the maximum connecting cross-sectional area are approximately of the same size as the free cross-sectional area of the delivery conduit.

In an advantageous way, there is only a single recess on the control collar and this recess is made as compact as possible, that is to say with as small a peripheral surface as possible in relation to the cross-sectional surface. This prevents a throttle effect of the recess, which would otherwise lead to the injection quantity being influenced according to the engine speed or according to the delivery rate. Additionally a controlled influence can be exerted by stepped cross-sectional areas of the recess. In particular, controlled adjustment can additionally be obtained in this way.

A delivery-valve closing member with a passage cross-section increasing toward the pump working space can be produced especially simply.

The present invention both as to its construction so to its mode of operation, together with additional objects and advantages thereof, will be best understood from the following detailed description of the preferred embodiments with reference to the accompanying drawings.

DESCRIPTION OF THE PREFERRED EMBODIMENTS

Figure 1:
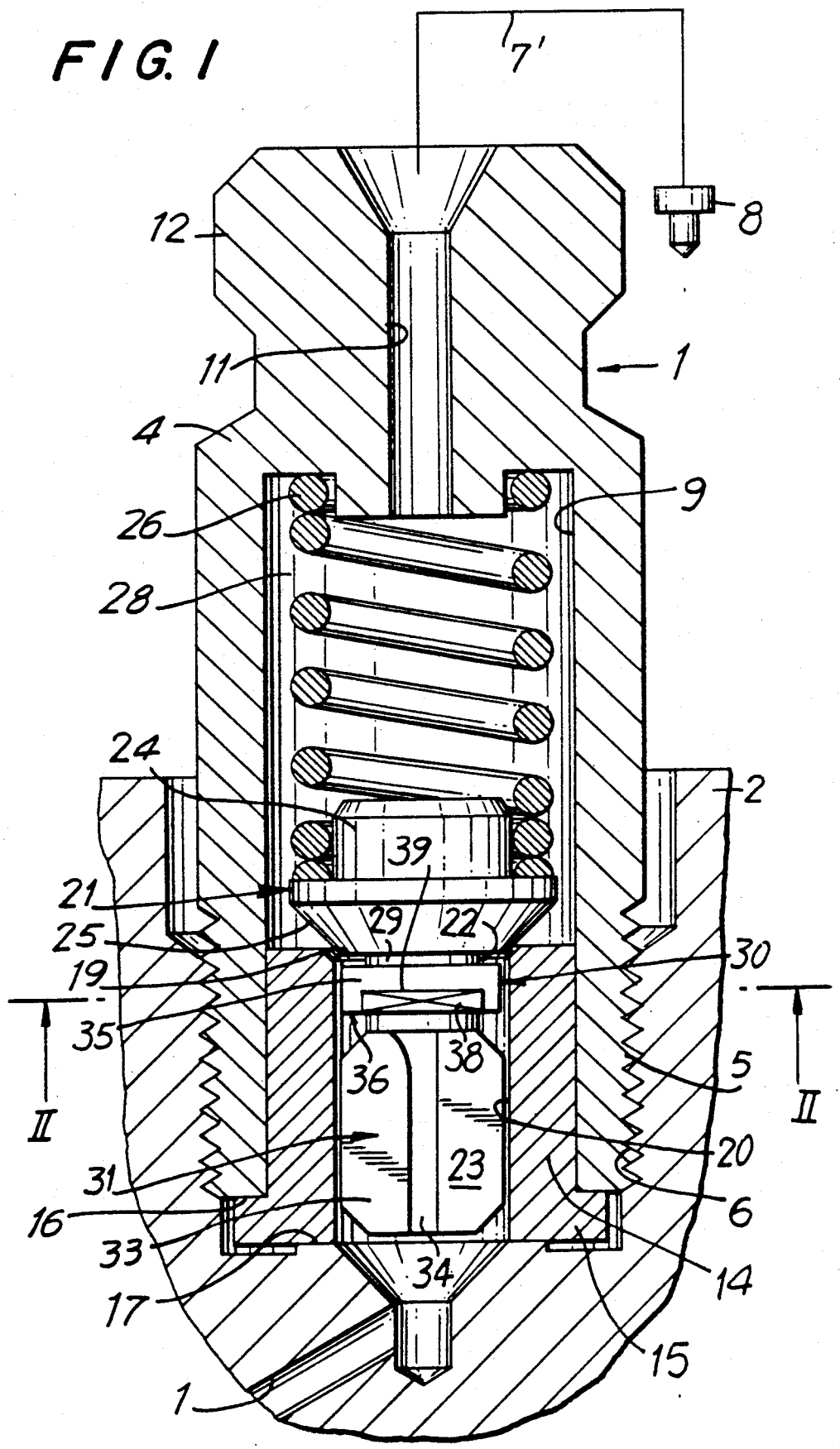
FIG. 1 shows a a cross-sectional view of a first embodiment of a delivery valve according to the invention.

FIG. 1 shows a longitudinal cross-sectional view through a delivery valve 1 which is screwed into the housing 2 of a fuel-injection pump not shown in any more detail. The delivery valve 1 has a connection piece 4 which possesses an external thread 5 at one end by which thread the valve is screwed into a threaded bore 6 in the housing 2. A feed line 7 opens coaxially into the threaded bore from the pump working space (not shown further) of the fuel-injection pump. This feed line 7 communicates via the delivery valve 1 with an ongoing feedline 7', to the end of which an injection valve 8 is connected. The connection piece 4 is of an essentially cylindrical design and has an axial cylindrical bore 9 which is open towards the screw-in side. A connecting bore 11 extends from the cylindrical recess 9 coaxially relative thereto, opens into a connecting nipple 12 of the connection piece and connects the recess 9 to the feed line 7' or the injection valve 8.

Inserted into the axial recess 9 from the end located on the same side as the pump working space is a tubular valve-seat body 14 having, at its end located on the same side as the pump working space, a flange 15, via which it is held against a shoulder 17 at the bottom of the threaded bore 6 by that end face 16 of the connection piece located on the same side as the pump working space. The valve-seat body 14 has an axial passage channel 20 which, at its exit towards the bore, forms a discharge edge 22 merging into a conical valve seat 19. A valve closing member 21 of the delivery valve is guided into the passage channel and has a head 24 having a conical sealing face 25 which engages the valve seat when the valve closing member penetrates into the passage channel 20. The head 24 of the valve closing member is subjected to the force of a compression spring 26 which is supported on the end face defining the bore 9 and which operates to keep the valve closing member in the closing position or in engagement with the valve seat. The head of the valve closing member, together with the valve-seat body, thus enclose a spring space 28 in the bore 9. However, the valve seat can also be arranged at that end of the passage channel 20 located on the same side as the pump working space, in which case the sealing face is formed at the corresponding end of the valve member.

The sealing face 25 on the head of the valve closing member is limited, on the same side as the pump working space, by an annular groove 29 which on the other hand adjoins a collar 30. The collar diameter corresponds to the bore of the passage channel in such a way that it is displaceable sealingly in the passage channel. Adjoining the collar on the same side as the pump working space is a guide part 31 having guide ribs 34 which are formed by clearances 33 and which slide in the passage channel 20 and guarantee a tilt-free movement of the valve closing member. Between the guide ribs, the clearances form passage cross-sections for fuel which flows via the feed line 7 into the passage channel 20 to the collar 30.

The collar 30 is usually called a return-flow collar or relief collar, and so far as has been described hitherto the valve closing member corresponds to that of a known delivery valve with a return-flow collar. When a high-pressure feed takes place from the pump working space, the cross-section of the valve closing member 21 is subjected to the high pressure and the valve closing member is displaced counter to the force of the compression spring 26. The collar 30 thereby emerges from the passage channel 20 and at the same time even at this early stage forces fuel into the feed line 7', thus increasing the residual pressure prevailing there in front of the injection valve 8. When a specific pressure determined by the opening pressure of the injection valve is exceeded, fuel injection takes place. With the collar 30 emerged, the fuel can flow past an annular formed connecting cross-section into the spring space 28 and on to the injection valve. At the end of the injection phase, the pressure in the pump working space is reduced. The closing member 21 thereby returns to its closing position under the effect of the compression spring on the one hand and the pressure prevailing in the feed line 7' or spring space 28. At the same time, the collar 30 penetrates into the passage channel 20 past the discharge edge 22 and thus, from the moment when the first part of the collar 30 located in the same side as the pump working space is covered by the discharge edge 22, enlarges the volume then enclosed between the delivery-valve closing member and the injection valve, with a simultaneous relief of pressure. This operating mode is known and need not be described in more detail here.

In contrast to the conventional design of such delivery valves, the collar 30 is now subdivided into a return-flow collar 35 and a control collar 36. The control collar, on its periphery, has a recess 38 in the form of a ground portion, of which the limiting edge pointing to the head 24 is parallel to the discharge edge 22 and determines the height of the control collar 36. Moreover, the control collar 36 merges continuously into the return-flow collar 35.

Figure 2:
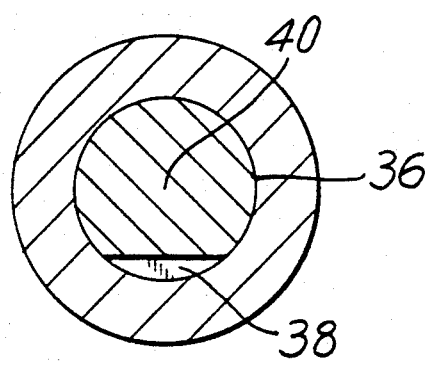
FIG. 2 shows a sectional view along lines II—II of the valve shown in FIG. 1.

The recess 38 is shown in section in FIG. 2. As illustrated there, it can be a straight ground portion or a ground portion with a circular limiting face parallel to the axis 40 of the valve closing member. The recess 38 forms a passage cross-sectional area which is made compact by providing the recess 38 on one side of the control collar 36. In addition to a ground portion, it is also possible to have other compact recess forms which, together with the wall of the passage channel 20, constitute a passage cross-sectional area.

In the delivery valve described here, the connecting cross-section between the feed line 7 and the feed line 7' is determined by the degree of emergence of the control collar 36 from the passage channel 20. When the closing member is lifted, the discharge edge 22 increasingly exposes a connecting or flow cross-sectional area which is determined by the product of the emerging stroke and the length of the limitation of the recess 38 on the same side as the passage channel. Thus, during the opening of the delivery valve, the connecting cross-section between the feed-line portions 7 and 7' which is necessary for an unimpeded feed is provided by a stroke influenced by the recess 38. The passage cross-sectional area formed between the recess and passage channel 20 is as small as possible, but large enough to ensure that, at the maximum delivery rate, the fuel can flow through as unimpeded as also occurs in the delivery line of corresponding size. This means that the maximum flow cross-sectional area at the control collar is approximately the same as the flow cross-sectional area of the delivery line 7'. At the same time, the delivery-valve closing member must execute a higher stroke than was necessary in the state of the art discussed in the introduction. The height of the control collar is calculated such that part of this always remains within the passage channel 20, thus safely maintaining a desired maximum passage cross-section. The design according to the invention therefore guarantees that the maximum fuel-injection quantity arrives unimpeded at the injection point, and that the connecting cross-sectional area is matched to the particular prevailing delivery rate so as to prevent an overswing of the type described in the introduction. Because of the relatively large strokes necessary for controlling the passage cross-sectional area, a slight swaying of the delivery-valve closing member no longer has any appreciable effect on the fuel-injection quantity or the injection-quantity curve.

Figure 3:
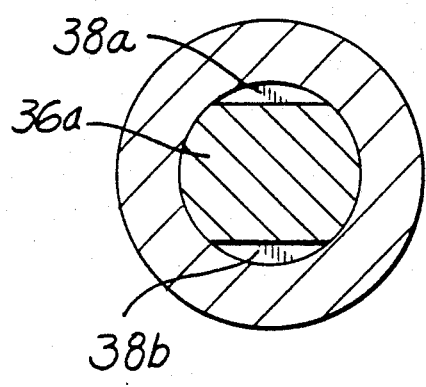
FIG. 3 shows a sectional view similar to that of FIG. 2 of a second embodiment of the delivery valve according to the invention.

In a further embodiment according to FIG. 3, the control collar 36a is equipped with two recesses 38a or 38b which are located diametrically opposite one another. This, although departing from the compactness of the passage cross-section, nevertheless is beneficial to the equal loading of the delivery-valve closing member.

Figure 4:
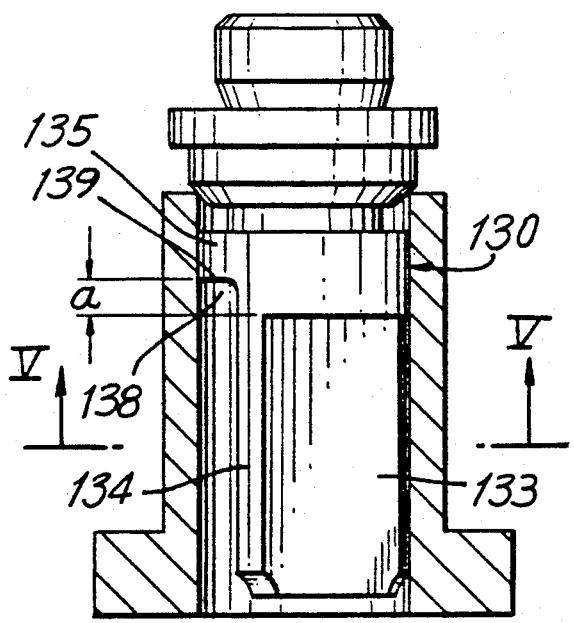
FIG. 4 shows a cross-sectional view of a delivery valve of a third exemplary embodiment.
Figure 5:
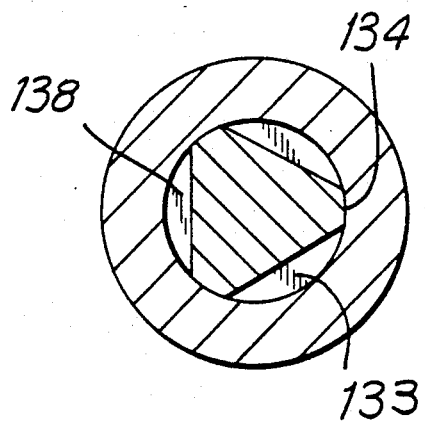
FIG. 5 shows a sectional view of the valve shown in FIG. 4 along the line V—V.

In a third embodiment according to FIG. 4, the delivery-valve closing member 121 has only three guide ribs 134 which are arranged at an angular distance of 120° from one another. As can be seen in FIG. 5, the clearances 133 are in the form of ground portions on an otherwise circular-cylindrical body, the ground portion 133 at the same time also limiting the collar 130 on the same side as the pump working space. On one side, however, the ground portion is nearer to the side of the head of the valve closing member by the amount a, the limiting edge 139 located on the same side as the valve seat determining the height of the return-flow collar 135. The recess 138 is formed by this ground portion over the length a located on the same side as the pump working space.

Figure 6:
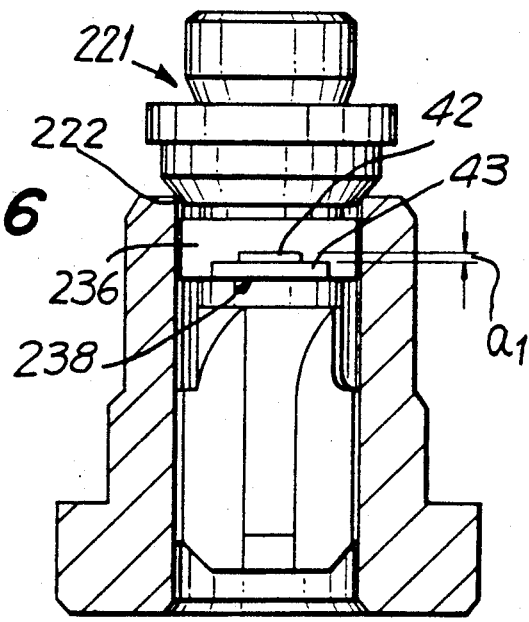
FIG. 6 shows a cross-sectional view of a delivery valve of a fourth embodiment with a stepped ground portion.

In a fourth exemplary embodiment according to FIG. 6, the recess 238 is stepped in such a way that, during the crossing of the discharge edge 222, first a smaller passage cross-section 42 is opened increasingly over a specific stroke length al, this then being followed by a larger passage cross-section 43 which is exposed by the discharge edge 222 during the further course of the opening stroke of the valve closing member 221. If required specifically, a compensating groove known per se, which operates in a function of the engine speed, can be additionally provided in front of the ground portion and thus, under specific conditions of construction of the injection system, the injection is matched to a uniform injection curve. In FIG. 6, this was achieved by ground portions of different depths on the control collar 236.

Figure 7:
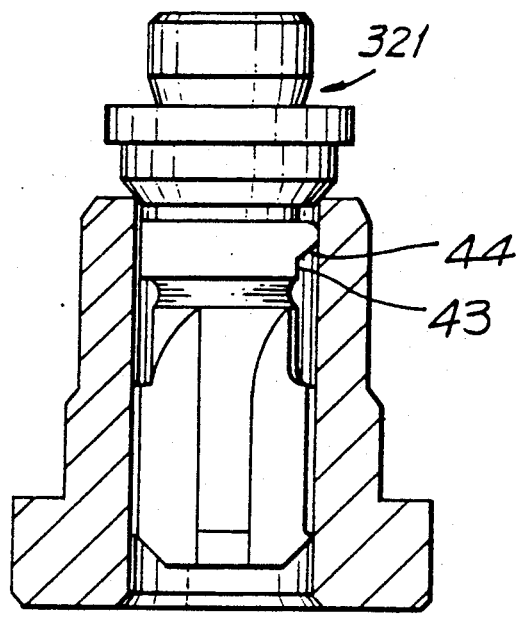
FIG. 7 shows a cross-sectional view of a delivery valve of a fifth embodiment with a recess cross-section enlarging continuously towards the pump working space side.

Instead of the stepped version with the ground portion 42 according to FIG. 6, according to FIG. 7 there can also be an oblique ground portion 44, with which it is possible to obtain an increasing opening rate of the connecting cross-section continuously with an increasing deflecting stroke of the delivery-valve closing member 321 in the opening direction and at the same time also ensure corresponding matching with respect to as a function of the engine speed.

Figure 8:
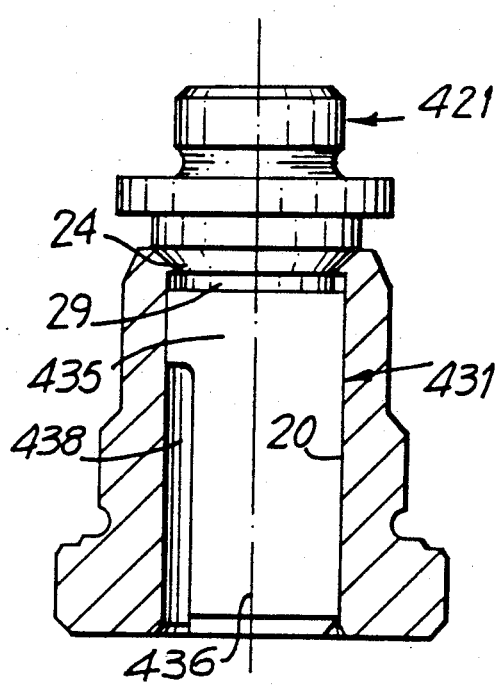
FIG. 8 shows a cross-sectional view of a delivery valve of a sixth embodiment with a cylindrical guide part on the closing member of the delivery valve.

FIG. 8 illustrates a sixth embodiment of the delivery valve. Here, in a development of FIG. 4, the delivery-valve closing member 421 is designed without the clearances 133 forming the guide ribs 134, and therefore the guide part 431 is now a cylindrical part which slides sealingly in the passage bore 20 and which is delimited from the sealing face 25 by the annular groove 29. Formed on this guide part towards the sealing face 25 is the return-flow collar 435 which adjoins a recess 438 in the form of a ground portion parallel to the axis of the delivery-valve closing member. The ground portion extends over the remaining length of the guide part and performs the function of the recess 138 of FIG. 4 or the recess 38 of FIG. 1. This part of the guide part 431 is therefore at the same time the control collar 436. Such a valve closing member can be produced especially simply.

While the invention has been illustrated and described as embodied in a delivery valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A delivery valve for controlling fuel flow from a fuel-injection pump to an internal combustion engine having a fuel injection point, said delivery valve comprising a seat member having a valve seat and a passage channel defining a delivery edge; a closing member movable relative to said valve seat for controlling flow of fuel through said passage channel; and a spring for biasing said closing member into engagement with said valve seat, said closing member including a collar subdivided into a return-flow collar and a control collar, said return-flow collar being sealingly displaceable in said passage channel, extending into said passage channel in a closed position of said delivery valve, and located outside of said passage channel in a open position of said delivery valve, and said control collar being located adjacent to said return-flow collar and having a diameter corresponding to a diameter of said passage channel, said control collar also having a periphery and at least one recess formed on said periphery and extending along an entire length of said control collar, said at least one recess having a variable cross-sectional area defining with said delivery edge a connecting flow cross-section area between a working chamber of the fuel injection pump and a conduit for delivery fuel to the fuel injection point the size of said variable cross-sectional area of said recess being so selected that it is smaller than at least the maximum size of said connecting flow cross-sectional area increasing with an increase in a fuel delivery rate upon displacement of said closing member against bias of said compression spring.

2. A delivery valve as set forth in claim 1, wherein the maximum size of said variable cross-sectional area is substantially equal to a cross-sectional area of the delivery conduit.

3. A delivery valve as set forth in claim 1, wherein said recess has a peripheral surface which is substantially smaller than the maximum size of said variable cross-sectional area of said recess.

4. A delivery valve as set forth in claim 1, wherein at a maximum delivery rate, at least a portion of said control collar and a portion of a length of said recess remain in said passage channel.

5. A delivery valve as set forth in claim 1, wherein said closing member has a head having a sealing surface for engaging said valve seat, said return-flow and control collars being formed on a portion of said closing member than extends from said sealing surface and into said passage channel, said closing member further including a guide portion formed adjacent to said control collar and having on an outer peripheral surface thereof a plurality of ribs forming a plurality of slots therebetween, one of said plurality of slots extending over an entire length of said control collar and defining said recess.

6. A delivery valve as set forth in claim 3, wherein said closing member has a head having a sealing surface for engaging said valve seat and a cylindrical portion extending from said sealing surface into said passage, and forming said return-flow collar adjacent to said sealing surface and said control collar which is arranged on a side of said return-flow collar remote from said sealing surface and defines a guide portion of said closing member.

7. A delivery valve as set forth in claim 1, wherein said recess is defined by a ground portion of said control member.

8. A delivery valve as set forth in claim 7, wherein said variable cross-sectional area increases to an end of said recess remote from said delivery edge.

9. A delivery valve as set forth in claim 7, wherein said recess is a stepped recess a cross-sectional area of which increases to an end of said recess remote from said delivery edge.

* * * * *